United States Patent [19]

Basse et al.

[11] Patent Number: 4,985,182
[45] Date of Patent: Jan. 15, 1991

[54] PACKING ELEMENT

[75] Inventors: Hartwig Basse; Jürgen Wittek, both of Nordenham, Fed. Rep. of Germany

[73] Assignee: Norddeutsche Seekabelwerke Aktiengesellschaft, Nordenham, Fed. Rep. of Germany

[21] Appl. No.: 430,065

[22] Filed: Nov. 1, 1989

Related U.S. Application Data

[63] Continuation of Ser. No. 215,487, Jul. 6, 1988, abandoned.

[30] Foreign Application Priority Data

Jul. 18, 1987 [DE] Fed. Rep. of Germany ....... 3723804

[51] Int. Cl.[5] .............................................. B01J 19/30
[52] U.S. Cl. .............................. 261/94; 261/DIG. 72; 210/150
[58] Field of Search ................... 261/DIG. 72, 94–98, 261/79.2, 122; 210/615, 150

[56] References Cited

U.S. PATENT DOCUMENTS

| D. 243,531 | 3/1977 | Strigle, Jr. ................ | 261/DIG. 72 |
|---|---|---|---|
| 3,266,787 | 8/1966 | Eckert ....................... | 261/DIG. 72 |
| 3,430,934 | 3/1969 | Weishaupt ................. | 261/DIG. 72 |
| 4,067,936 | 1/1978 | Ellis et al. ................. | 261/DIG. 72 |
| 4,600,544 | 7/1986 | Mix ........................... | 261/DIG. 72 |

FOREIGN PATENT DOCUMENTS

| 1051814 | 3/1959 | Fed. Rep. of Germany . |
| 2185437 | 4/1974 | France . |
| 2263809 | 10/1975 | France . |

OTHER PUBLICATIONS

Billet et al., "Neuartige Füllkörper aüs Kunststoffen für thermische Stofftrennverfahren," *Sonderdruck* 9(1980) Nr. 5, 219–226.

*Primary Examiner*—Tom Wyse
*Attorney, Agent, or Firm*—Sughrue, Mion, Zinn, Macpeak & Seas

[57] ABSTRACT

A packing element having a cylindrical outer cover (11) with at least one guiding surface (16, 20, 21) of holohedral construction and dividing the outer cover (11) into several subspaces (19). The outer cover (11) has web ribs (12), running in the longitudinal direction of the cover, and annular ribs (13), running perpendicularly to the web ribs, thus forming approximately square net openings (14).

10 Claims, 2 Drawing Sheets

PACKING ELEMENT

This is a continuation of application Ser. No. 07/215,487, filed July 6, 1988, now abandoned.

BACKGROUND OF THE INVENTION

The invention relates to a packing element comprising preferably one cylindrical outer cover and having at least one guiding surface arranged in the interior thereof.

Packing elements of the type addressed here are applied mainly where an interchange of substances between gas streams and liquid is desired, for example absorption, desorption, destillation, rectification, extraction, humidification, condensation, and the like. This type of packing element has proven to be especially successful in the field of waste water technology. Here it is employed both in random dumping and in ordered patterned rows and, as is the case particularly with biological waste gas treatment, serve as growing surfaces for "biofilm".

Numerous variations of this type of packing element are known. These are usually comprised of a cylindrical outer cover, either having openings in the cover surface or having a web structure. Inside such outer covers there are inserts having at least one guiding surface for increasing the specific surface of the packing element. The guiding surface or guiding surfaces inside of the packing element thus form drain surfaces and/or growing surfaces for the "biofilm".

The guiding surface or guiding surfaces unavoidably restrict the hydraulic properties of the packing element, i.e. the dumping or grouping of the packing elements resulting therefrom. This in turn increases the energy expenditure for passing the available medium through the packing element. The problem then is to so construct the packing element, particularly the guiding surfaces arranged therein such that these constitute a successful compromise between a good passage of gases and/or passage of liquids on the one hand and a satisfactory interchange of substances on the other hand. Moreover, the packing elements must have a sufficient inherent stability so as not to become deformed under the dead weight of other packing elements and/or the hydraulic stresses when large quantities of packing elements are dumped or packed. Finally, a good sludge discharge, especially of dead biomass, must be ensured for reliable prevention of blockages in the packing elements.

SUMMARY OF THE INVENTION

Proceeding herefrom, the objective of the invention is to create a stable packing element having good hydraulic properties, thereby making possible a relatively large transfer of substances and ensuring a reliable sludge discharge while aiming for an ease of fabrication.

To achieve this objective, the packing element mentioned in the introduction has been further developed such that at least one guiding surface is contructed as a continuous closed surface so that it divides the packing element into several (sub)spaces. By means of the subspaces in the packing element defined flow paths are created, making good ventilation both in the cross and the longitudinal directions of the packing element possible and ensuring a reliable sludge discharge along this flow path. By subdividing the interior of the outer cover at least one continuous closed guiding surface with a relatively large surface is created so that said outer cover has relatively large settlement surfaces. The continous guiding surface stabilizes the outer cover to the extent that it becomes sufficiently capable of bearing. The guiding surfaces are also easy to produce because of their simple, continuous structure.

Appropriately, the guiding surface (or guiding surfaces) run continuously in the longitudinal direction of the outer cover, thus creating in said outer cover flow channels in longitudinal direction which make possible optimum ventilation in the longitudinal direction, but also — as was shown surprisingly — good cross ventilation. These properties are improved still more when the (sub)spaces formed in the outer cover by means of the guiding surface or guiding surfaces are approximately equally large. As a result, especially in the case of random packing element dumping it is ensured that said packing elements on the whole have balanced properties, particularly as regards flow mechanics. The formation of sludge clusters in the packing element dumping is prevented in particular. Otherwise, said sludge clusters could develope into a nucleus formation for blockages.

Preferably arranged in the interior of the outer cover are several guiding surfaces, preferably of a star-shaped configuration, thereby creating relatively large settlement and/or drain surfaces which form flow channels in a circular segment-shaped configuration in the outer cover. Depending on the number of guiding surfaces three or four winged, but also multi-winged stars can be formed in the interior of the outer cover. If required, the guiding surfaces arranged in a star-shaped configuration can run in a screw-like twisted manner in the outer cover, thus ensuring sufficient movement of the medium to be used for treatment in the packing elements. In addition or supplementarily, the guiding surfaces can also be profiled, for example wavy. It is also possible to provide the guiding surfaces with perforations.

According to another proposal of the invention the guiding surfaces arranged in a star-shaped configuration are joined to one another along a common line of contact, which for practical purposes coincides with the longitudinal center line of the outer cover. This creates equally large (sub) spaces with symmetrical cross sections in the outer cover.

In reference to the structure of the outer cover, proposal according to invention is made to construct it either areally with grid-like perforations or as a webbed or net-like structure. In the latter case the outer cover constitutes only a slight resistance to penetration by the medium to be treated. Thus the web ribs of the outer cover act predominantly as spacer to the adjacent packing elements.

According to yet another proposal of the invention the edges of the guiding surfaces directed toward the outer cover each are joined to a web rib running in longitudinal direction to the outer cover. This ensures a sufficiently stable connection to the web of the outer cover, because despite the web structure a continuous, linear connection between the outer cover on the one hand and the respective edges of the guiding surfaces on the other hand are so possible.

For practical purposes the packing elements according to invention are made of plastic, namely thermoplastic, whereby continuous extrusion of a packing element tube in one operation is economically feasible. By cutting off individual sections from this tube it is possible to form the individual packing elements just as simply. Furthermore, this simple fabrication of the packing elements according to invention, namely by extrusion, is favoured by the special structure and arrangement of the continuous guiding surfaces in the outer cover.

Embodiments of the packing element according to invention are described in detail below in reference to the drawings.

Shown are:

DETAILED DESCRIPTION OF PREFERRED EMBODIMENTS

Figure 1:
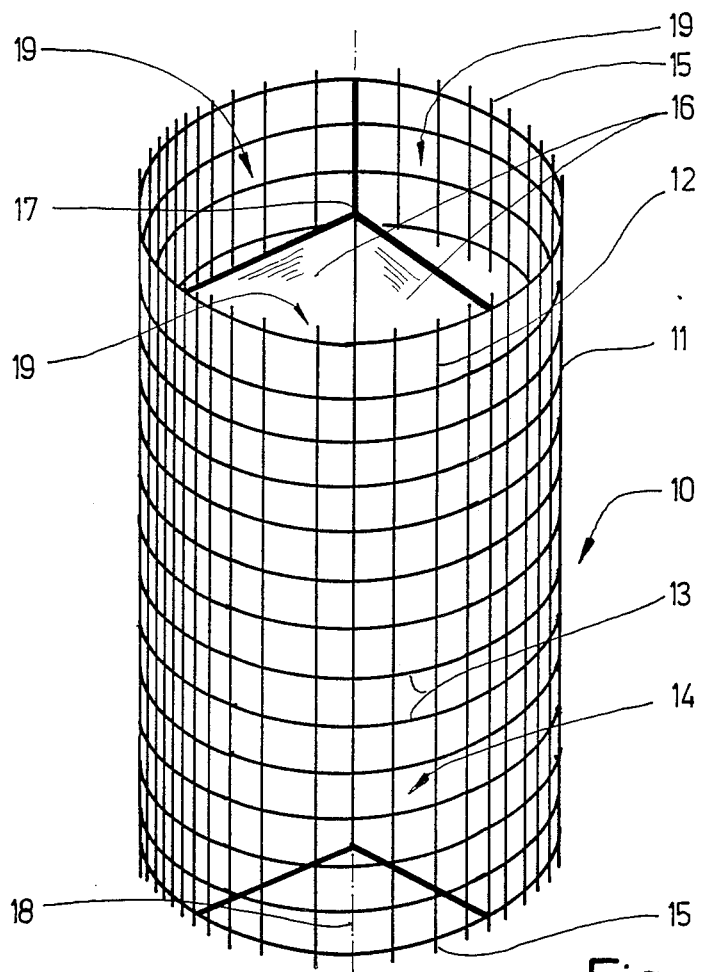
FIG. 1 a perspective representation of a packing element with three star-shaped guiding surfaces converging upon one another in the outer cover.

The embodiments shown here have a packing element 10 which preferably is suited for (irregular) packing element dumping for biological waste water treatment. The packing elements 10 shown each have a cylindrical outer cover 11 with a web M net-like structure. Hence, the outer cover 11 is composed of several web ribs 12 spaced apart and running parallel to one another in the longitudinal direction of the packing element 10 and of annular ribs 13 spaced apart and running parallel to one another in cross direction to the longitudinal length of the packing element 10 and at right angles to said web ribs. The web ribs 12 and the annular ribs 13 are fused together at their intersecting points and are spaced approximately the same distance from one another so as to form approximately square web openings 14. The length of the web ribs 12 is selected such that in relation to the upper or lower annular rib 13 of the packing element 10 they project to form drip-off portions 15.

Figure 2:
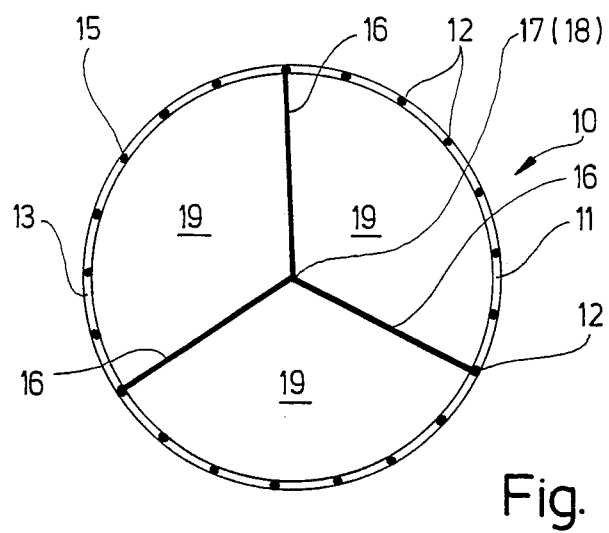
FIG. 2 a plan view of the packing element according to FIG. 1.

Arranged in the webbed outer cover 11 of the embodiment in FIGS. 1 and 2 are three guiding surfaces 16 converging upon one another in a star-shaped configuration. The guiding surfaces 16 are joined to one another along a connecting line 17 such that said connecting line 17 coincides with the longitudinal center line 18 of the packing element 10. The relative arrangement of the three star-shaped guiding surfaces 16 is chosen to be symmetrical here such that each of the two guiding surfaces 16 include an angle of approx. 120°, thus forming three approximately equally large subspaces 19 in the outer cover 11 of the packing element 10. Limited by the respective section of the outer cover 11, said subspaces have an area equivalent to about a third of a circular section. The (outer) edges of the guiding surfaces 16 opposite to the connecting line 17 are connected to the outer cover 11 in a particular way, each namely is connected to one of the web ribs 12 extending in longitudinal direction.

The equally large, rectangular guiding surfaces 16 in the present embodiment have an even, continuous surface structure and extend over the entire length of the web ribs 12, i.e. along the entire packing element 10.

Figure 3:
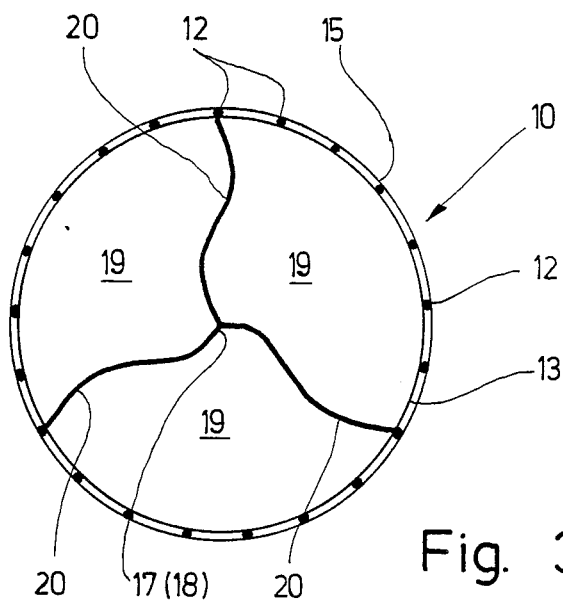
FIG. 3 a plan view according to FIG. 2 of a second embodiment of the packing element having three wavy-shaped guiding surfaces arranged in a star-shaped configuration and FIG. 4 a plan view according to FIGS. 2 and 3 of another embodiment of the packing element with four (smooth) guiding surfaces intersecting at right angles.

There are also three equally large, continuous guiding surfaces 20 arranged in a star-shaped configuration in the webbed outer cover 11 of the embodiment in FIG. 3. The special feature of these guiding surfaces 20 is that they have a wavy structure, preferably having two opposing half-waves of a sine oscillation. Moreover, also conceivable are waves shapes deviating herefrom for the guiding surfaces 20, particularly several successive wavy lines for each guiding surface 20.

Figure 4:
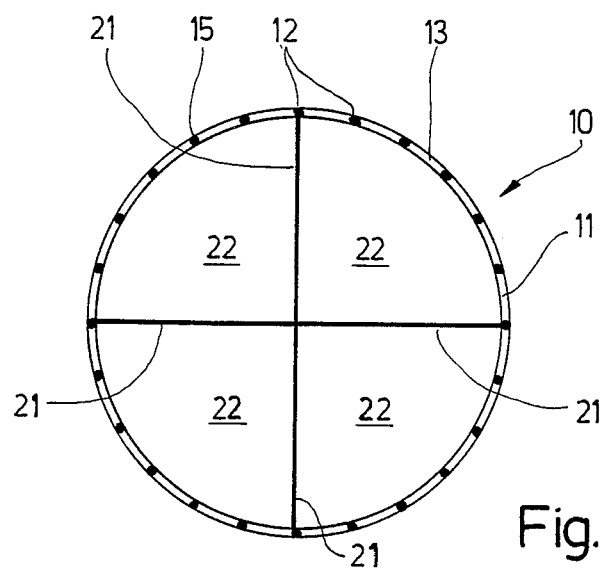

Finally, the embodiment in FIG. 4 shows a packing element 10 with four guiding surfaces 21 arranged in two different planes, converging at right angles upon one another so that two guiding surfaces 21 each are situated adjacent to one another in the same plane. In the outer cover 11 these guiding surfaces 21 form four equally large subspaces 22 each having an area equivalent to a quarter of a circular section. These guiding surfaces too may have a wavy or profiled structure, if required.

Moreover it is conceivable to accommodate a still greater number of guiding surfaces in the packing element. Likewise, the guiding surfaces can run helically along the packing element 10, preferably twisted screw-like. It is also conceivable to provide the guiding surfaces with perforations.

The packing elements 10 described above are produced in one piece from plastic, preferably thermoplastic, and in particular continuously by extrusion. From the endless packing element tube produced thusly the packing elements 10 can be cut off simply to the desired length. This cutting off into sections is to be carried out preferably between two annular ribs 13 in cross direction to the longitudinal direction of the packing element tube. This unavoidably forms the drip-off portions 15 from the segments of the projecting web ribs 12 situated opposite to the outer annular ribs 13. Depending on the length of the packing elements 10 these may be arranged in a random packing element dumping (short packing elements 10) or in an ordered packing element pack (long packing elements 10).

What is claimed is:

1. A packing element comprising:
   a cylindrical outer cover (11) having a longitudinal axis and a net-like construction; and
   at least one closed guiding surface inside said net-like outer cover (11) and dividing said cover into several subspaces;
   wherein said outer cover (11) has longitudinal web ribs (12), running in the longitudinal direction of said cover, and annular ribs (13) running perpendicularly to said web ribs, thus forming approximately square net openings (14) in the cylindrical surface of said cover (12);
   the guiding surface (16, 20, 21) pointing longitudinally towards said outer cover (11) and being joined to a longitudinal web rib (12) of said outer cover (11);
   the cylindrical surface area encompassed by said square net openings being larger than that encompassed by said web ribs (12) and said annular ribs (13).

2. A packing element according to claim 1, wherein the guiding surface (16, 20, 21) divides the outer cover (11) into approximately equally large subspaces (19, 22).

3. A packing element according to claim 2, wherein the guiding surface (16, 20, 21) runs continuously in the longitudinal direction of the outer cover (11).

4. A packing element according to claim 3, further comprising at least one additional said guiding surface, and wherein the guiding surfaces (16, 20, 21) are profiled, running wave-like in cross direction to the outer cover (11).

5. A packing element according to claim 1, further comprising at least one additional said guiding surface, and wherein said guiding surfaces (16, 20, 21) are connected to one another.

6. A packing element according to claim 5, wherein the guiding surfaces (16, 20, 21) connected to one another are arranged in a star-shaped configuration.

7. A packing element according to claim 6, wherein the guiding surfaces (16, 20, 21) of a star-shaped configuration are twisted screw-like in the outer cover (11).

8. A packing element according to claim 5, wherein a common connecting line (17) connecting the guiding surfaces (16, 20, 21) is situated approximately on the longitudinal center line (18) of the outer cover (11).

9. A packing element according to claim 8, wherein the guiding surfaces (16, 20, 21) are approximately equally large and arranged radially relative to the cylindrical outer cover (11).

10. A packing element according to claim 1, wherein said packing element is made of thermoplastic.

* * * * *